(12) United States Patent
Koyanagi et al.

(10) Patent No.: US 7,834,584 B2
(45) Date of Patent: Nov. 16, 2010

(54) CHARGING SYSTEM OF BIPED WALKING ROBOT

(75) Inventors: Takuro Koyanagi, Wako (JP); Satoshi Kaneko, Wako (JP); Ryuma Ujino, Wako (JP); Takashi Nakayama, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 218 days.

(21) Appl. No.: 11/212,687

(22) Filed: Aug. 29, 2005

(65) Prior Publication Data

US 2006/0043929 A1  Mar. 2, 2006

(30) Foreign Application Priority Data

Sep. 1, 2004  (JP) .............................. 2004-253817

(51) Int. Cl.
*H02J 7/00* (2006.01)
*B25J 5/00* (2006.01)

(52) U.S. Cl. ...................... 320/107; 320/137; 320/166; 318/568.12; 901/1

(58) Field of Classification Search ................. 320/107, 320/137, 166
See application file for complete search history.

(56) References Cited

U.S. PATENT DOCUMENTS

| | | | | |
|---|---|---|---|---|
| 5,099,187 A | * | 3/1992 | Rippel | 320/166 |
| 5,904,597 A | | 5/1999 | Doi et al. | |
| 6,188,554 B1 | * | 2/2001 | Chung | 361/58 |
| 6,480,761 B2 | * | 11/2002 | Ueno et al. | 700/245 |
| 6,565,371 B1 | | 5/2003 | Watanabe | |
| 6,764,373 B1 | * | 7/2004 | Osawa et al. | 446/175 |

FOREIGN PATENT DOCUMENTS

| | | | |
|---|---|---|---|
| GB | 2276963 | | 10/1994 |
| GB | 2276963 A | * | 10/1994 |

(Continued)

OTHER PUBLICATIONS

Japanese Office Action, Japanese Patent Application No. 2004-253817, Date Issued: May 25, 2010, pp. 1-2.

*Primary Examiner*—Patrick J Assouad
*Assistant Examiner*—Johali A Torres Ruiz
(74) *Attorney, Agent, or Firm*—Squire, Sanders & Dempsey, LLP

(57) ABSTRACT

A charging system is capable of charging a battery of a biped walking robot while stabilizing the posture of the biped walking robot and also restraining the occurrence of spark discharge or noises. A charger of the charging system for charging the battery provided in the biped walking robot includes a seating and retaining unit for retaining the biped walking robot in a seated posture, a power feeding connector that is fitted to a power receiving connector provided in the biped walking robot when the biped walking robot sits on the seating and retaining unit, and a charging unit having a connection detector for detecting whether the power receiving connector and the power feeding connector are in a connected state, a charging power source for supplying charging current to the battery, and a charging controller that supplies charging current to the battery from the charging power source to charge the battery when the connection detector detects that the power receiving connector and the power feeding connector are in the connected state.

7 Claims, 7 Drawing Sheets

FOREIGN PATENT DOCUMENTS

| | | |
|---|---|---|
| JP | 59-201115 | 11/1984 |
| JP | 2000156933 A | 6/2000 |
| JP | 2000-323219 | 11/2000 |
| JP | 2001045670 A | 2/2001 |
| JP | 2001-79792 | 3/2001 |
| JP | 2001079792 A * | 3/2001 |
| JP | 2001-125641 | 5/2001 |
| JP | 2001-179663 | 7/2001 |
| JP | 2001179663 A * | 7/2001 |
| JP | 2001-341085 | 12/2001 |
| JP | 2004064861 A | 2/2004 |

* cited by examiner

CHARGING SYSTEM OF BIPED WALKING ROBOT

BACKGROUND OF THE INVENTION

1. Field of the Invention

The present invention relates to a system for charging a battery provided in a biped walking robot.

2. Description of the Related Art

As a system for charging a battery provided in a mobile body, there has been proposed a charging system (refer to, for example, Japanese Unexamined Patent Publication No. 2001-341085) for charging a battery of an unmanned carrier vehicle. According to the battery charging system, an unmanned carrier vehicle that runs by detecting a guideline laid along a track is moved to a place where an external power unit is installed. Then, a power receiving coupler provided in the unmanned carrier vehicle is connected to a power feeding coupler provided in the external power unit, thereby supplying power to the unmanned carrier vehicle through a power feeding coupler and a power receiving coupler to charge the battery of the unmanned carrier vehicle.

Further, as a system for charging a mobile robot provided with an imaging device to perform autonomic walking on the basis of imaging data, there has been proposed a charging system (refer to, for example, Japanese Unexamined Patent Publication No. 2001-125641) for charging a battery at a charging station. According to the charging system, a charging station for charging a battery is installed, and when the battery charge amount of a mobile robot decreases to a predetermined level or less, the mobile robot recognizes the position of the charging station on the basis of imaging data and moves to the charging station so as to charge the battery at the charging station.

As described above, when charging an unmanned carrier vehicle, turning off the power of the unmanned carrier vehicle presents no problem, because the unmanned carrier vehicle is maintained in a stationary state. In the case of a biped walking robot, however, if its power is turned off, then the position retaining operations of the motors of joints are disabled, making it difficult to maintain a standing posture thereof. Furthermore, a biped walking robot is frequently used in a human activity area, so that it is preferred that no spark discharge or noises occur when connecting or disconnecting a power receiving connector and a power feeding connector when charging is carried out.

SUMMARY OF THE INVENTION

Accordingly, it is an object of the present invention to provide a charging system capable of charging a battery of a biped walking robot while stabilizing the posture of the biped walking robot and restraining the occurrence of spark discharge or noises.

To this end, according to the present invention, there is provided a charging system for charging a battery installed on a biped walking robot, including a seating and retaining device on which the biped walking robot can sit and which retains the biped walking robot at a seated posture, a power feeding connector to be connected to a power receiving connector provided in the biped walking robot when the biped walking robot sits on the seating and retaining device, a connection detector for detecting whether the power receiving connector and the power feeding connector are in a connected state, a charging power source for supplying charging current to the battery, and a charging controller for charging the battery by supplying charging current to the battery from the charging power source through the power feeding connector and the power receiving connector when the connection detector detects that the power receiving connector and the power feeding connector are in the connected state.

With this arrangement, when the biped walking robot sits onto the seating and retaining device, the power receiving connector of the biped walking robot is connected to the power feeding connector and the biped walking robot is maintained at a seated posture. This makes it possible to quickly charge the biped walking robot in a state wherein the power of the biped walking robot is turned off or the power supply to a joint motor is interrupted to reduce power consumption. The charging controller supplies charging current to the battery from the charging power source when the connection detector detects that the power receiving connector of the biped walking robot and the power feeding connector are in the connected state. Hence, it is possible to restrain the supply of charging current from the charging power source from being begun before the connection between the power receiving connector and the power feeding connector is completed, thereby restraining spark discharge or noises from occurring at the contact between the power feeding connector and the power receiving connector. Thus, it is possible to prevent people nearby from feeling insecure or equipment nearby from malfunctioning due to noises.

Preferably, the power feeding connector includes a first charging terminal for outputting charging current and a first detecting terminal for detecting whether the power receiving connector and the power feeding connector are in the connected state, the power receiving connector includes a second charging terminal that is brought into conduction with the first charging terminal and a second detecting terminal that is brought into conduction with the first detecting terminal when the power receiving connector is connected with the power feeding connector. In the course of transition of the power feeding connector and the power receiving connector from a disconnected state to a connected state, the first charging terminal and the second charging terminal are brought into conduction, and then the first detecting terminal and the second detecting terminal are brought into conduction. The connection detector detects that the power feeding connector and the power receiving connector are in the connected state when the first detecting terminal and the second detecting terminal are brought into conduction.

With this arrangement, when the power receiving connector of the biped walking robot is connected to the power feeding connector, the first detecting terminal of the power feeding connector and the second detecting terminal of the power receiving connector are brought into conduction after the first charging terminal of the power feeding connector and the second charging terminal of the power receiving connector are brought into conduction. This enables the connection detector to detect that the power feeding connector and the power receiving connector are in the connected state when the first charging terminal and the second charging terminal are securely in conduction by detecting that the power feeding connector and the power receiving connector are in the connected state when the first detecting terminal and the second detecting terminal are in conduction.

In the course of the power feeding connector and the power receiving connector shifting from a connected state to a disconnected state, the first detecting terminal and the second detecting terminal are changed over to a non-conduction state, and then the first charging terminal and the second charging terminal are changed over to the non-conduction state. The charging system further includes a capacitor connected across output terminals of the charging power source, and a discharger for discharging charges from the capacitor, wherein, when the state detected by the connection detecting means is switched from the state wherein the power feeding connector and the power receiving connector are in connection to a state wherein the power feeding connector and the power receiving connector are not in connection, the charging controller stops output of charging current by the charging power source and discharges the charges from the capacitor by the discharger.

According to this arrangement, the first charging terminal and the second charging terminal are still in conduction at the point when the state in which the connection detector detects that the power feeding connector and the power receiving connector are in connection is switched to the state wherein the connection detector does not detect that the power feeding connector and the power receiving connector are in connection. Hence, stopping the charging current output by the charging power source and discharging the charges from the capacitor by the discharger at this point makes it possible to reduce the charges of the capacitor before the first charging terminal and the second charging terminal are switched from the conduction state to the non-conduction state. This in turn makes it possible to restrain the occurrence of spark discharge or noises caused by sudden cutoff of charging current of the charges of the capacitor when the first charging terminal and the second charging terminal are switched from the conduction state to the non-conduction state.

Preferably, the power receiving connector has, at its front, a shutter that closes an opening of the power receiving connector in a state wherein the power receiving connector has been disconnected from the power feeding connector, while the shutter is released to expose the opening as the power feeding connector comes in contact with the power receiving connector when fitted to the power feeding connector.

With this arrangement, when the power receiving connector has been disengaged from the power feeding connector, the opening of the power receiving connector is closed by the shutter. This allows the power receiving connector to be always protected except when charging the biped walking robot.

Preferably, the power receiving connector has a tapered recession whose inclined surfaces gradually approach each other toward a terminal from the opening, and the power feeding connector has a projection shaped to match the tapered shape of the power receiving connector.

With this arrangement, inserting the projection of the power feeding connector into the recession of the power receiving connector causes the power receiving connector to move toward the power feeding connector, the inner peripheral surface of the recession of the power receiving connector being guided to the outer peripheral surface of the projection of the power feeding connector. This permits easy positioning of the power receiving connector and the power feeding connector when connecting these two connectors.

Preferably, the first charging terminal and the first detecting terminal are pin-type terminals provided in parallel to each other, the second charging terminal is a socket-type terminal into which the first charging terminal is inserted when the power receiving connector and the power feeding connector are connected, the second detecting terminal is a socket-type terminal into which the first detecting terminal is inserted when the power receiving connector and the power feeding connector are connected, and the length of insertion of the first charging terminal into the second charging terminal is set to be greater than the length of insertion of the first detecting terminal into the second detecting terminal when the power receiving connector and the power feeding connector are connected.

With this arrangement, the length of insertion of the first charging terminal into the second charging terminal is set to be greater than the length of insertion of the first detecting terminal into the second detecting terminal when the power receiving connector and the power feeding connector are connected. Hence, when the power receiving connector is connected to the power feeding connector, the first charging terminal of the power feeding connector is first inserted into the second charging terminal of the power receiving connector, and then the first detecting terminal of the power feeding connector is inserted into the second detecting terminal of the power receiving connector. This makes it possible to achieve a configuration that brings the first charging terminal and the second charging terminal into conduction, and then brings the first detecting terminal and the second detecting terminal into conduction in the process of the power feeding connector and the power receiving connector shifting from a disconnected state to a connected state.

Similarly, when the power receiving connector is detached from the power feeding connector, the second detecting terminal of the power receiving connector is first disengaged from the first detecting terminal of the power feeding connector, and then the second charging terminal of the power receiving connector is disengaged from the first charging terminal of the power feeding connector. This makes it possible to achieve a configuration in which the first detecting terminal and the second detecting terminal are brought into a non-conduction state, and then the first charging terminal and the second charging terminal are brought into the non-conduction state in the process of the power feeding connector and the power receiving connector shifting from a connected state to a disconnected state.

DESCRIPTION OF THE PREFERRED EMBODIMENTS

Figure 1:
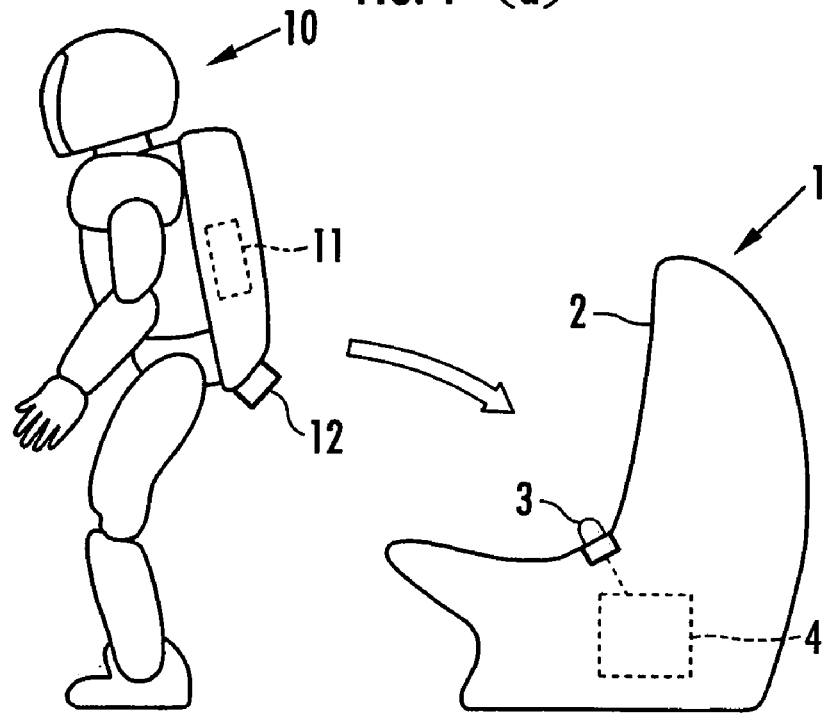
FIGS. 1A and 1B are explanatory diagrams showing how charging is performed by a charging system of a biped walking robot in accordance with the present invention.
Figure 1:
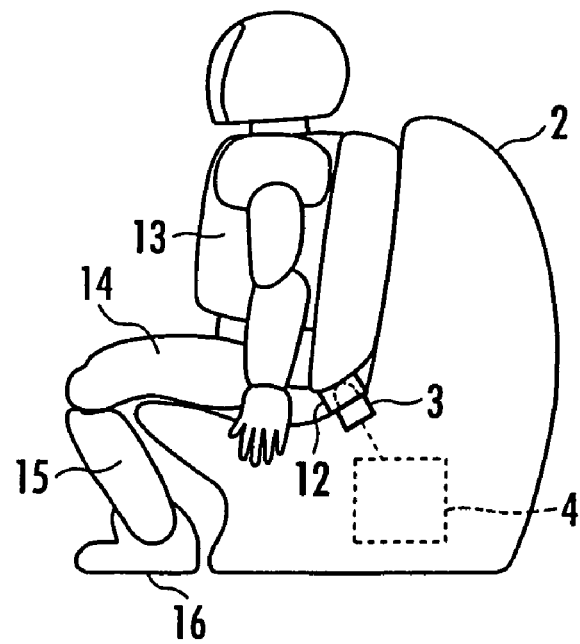
Figure 2:
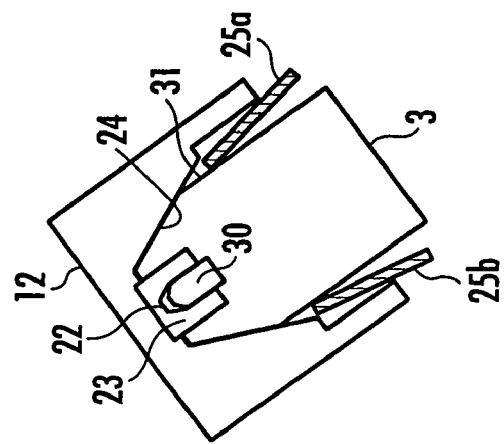
FIGS. 2A, 2B and 2C are configuration diagrams showing a power receiving connector provided in the biped walking robot and a power feeding connector provided in a charger.
Figure 2:
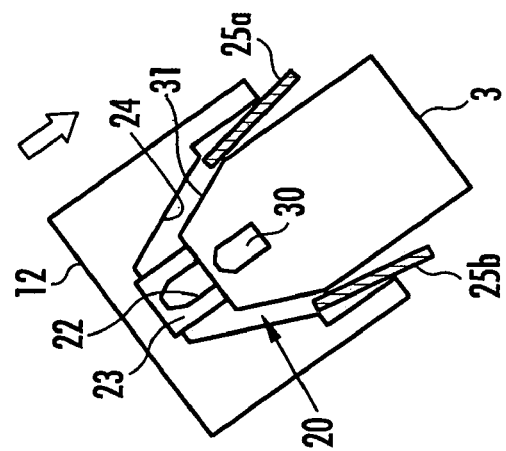
Figure 2:
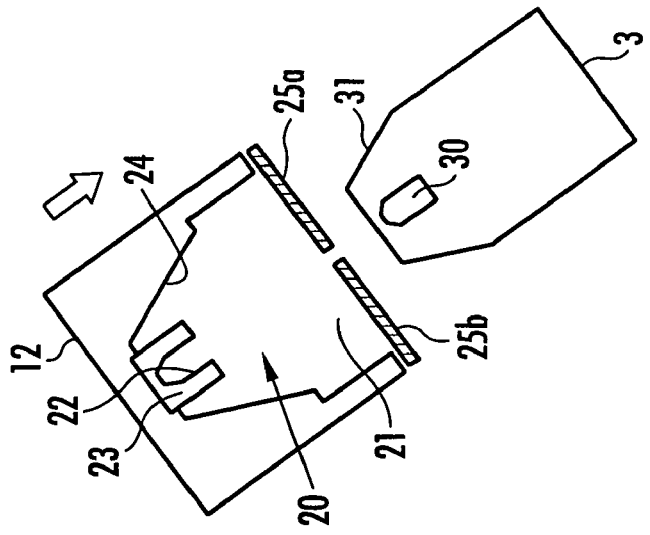
Figure 3:
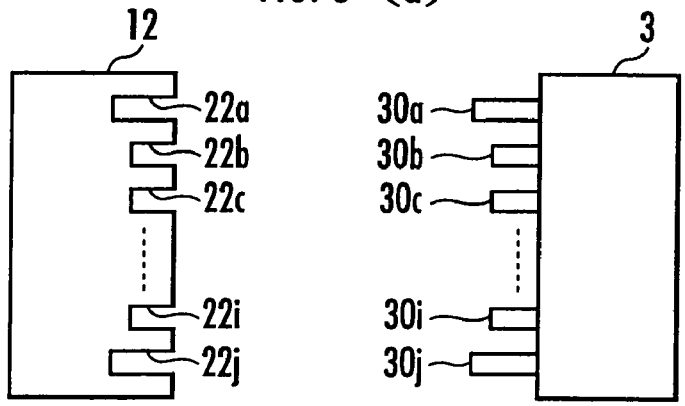
FIGS. 3A, 3B and 3C are configuration diagrams showing a terminal assembly of the power receiving connector provided in the biped walking robot and a terminal assembly of the power feeding connector provided in the charger.
Figure 3:
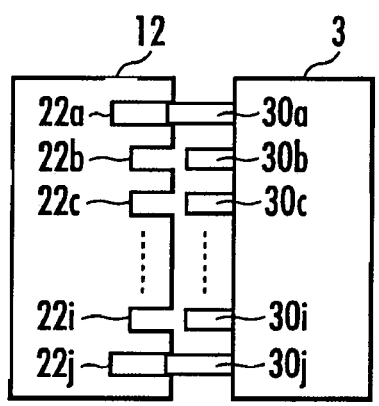
Figure 3:
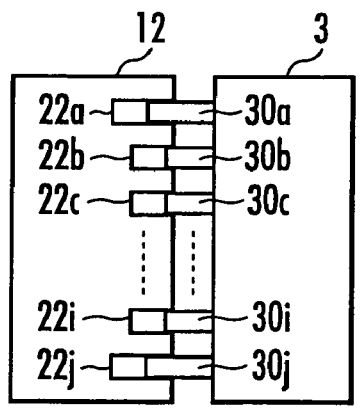
Figure 4:
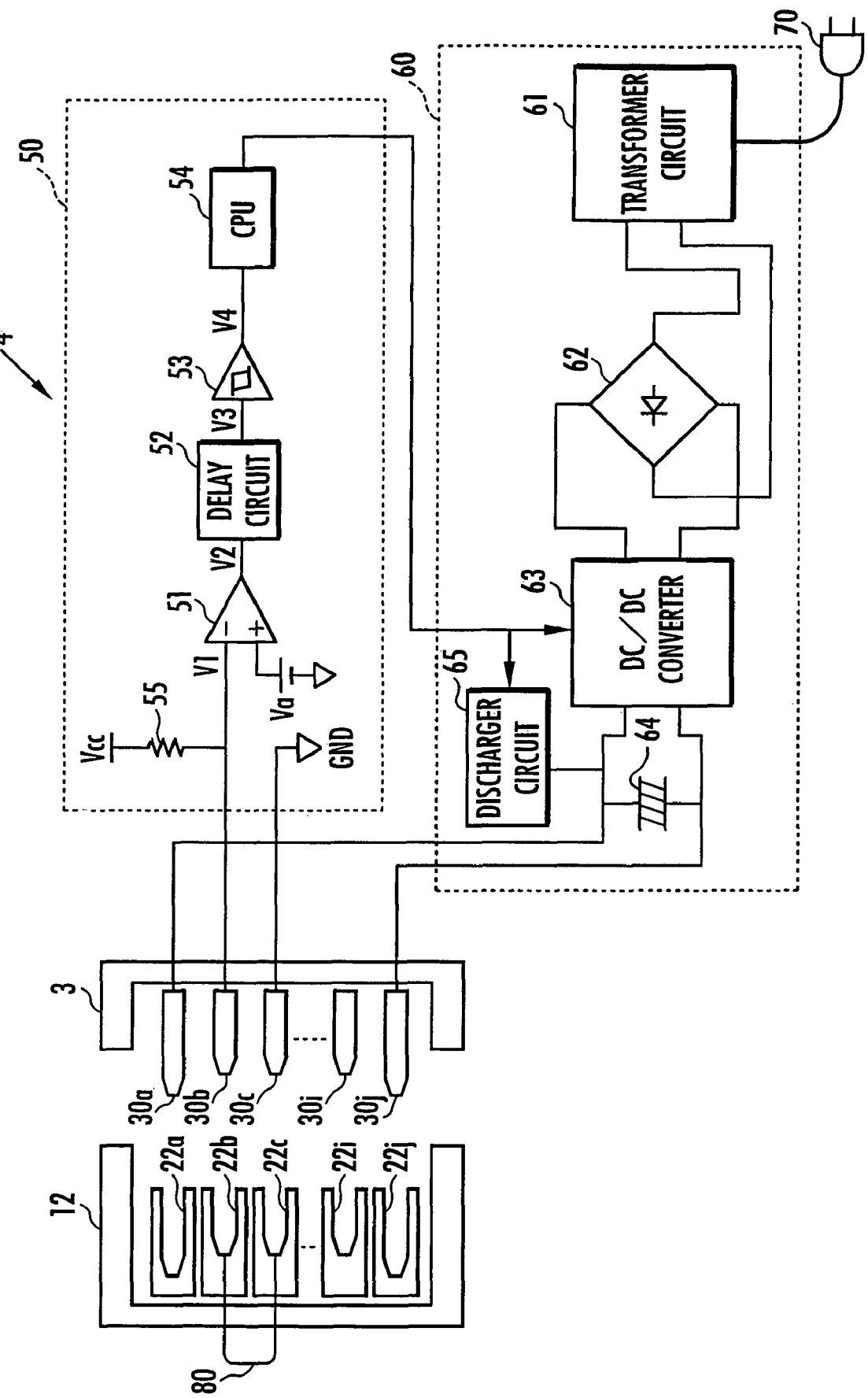
FIG. 4 is a circuit configuration diagram of a charging unit provided in the charger.
Figure 5:
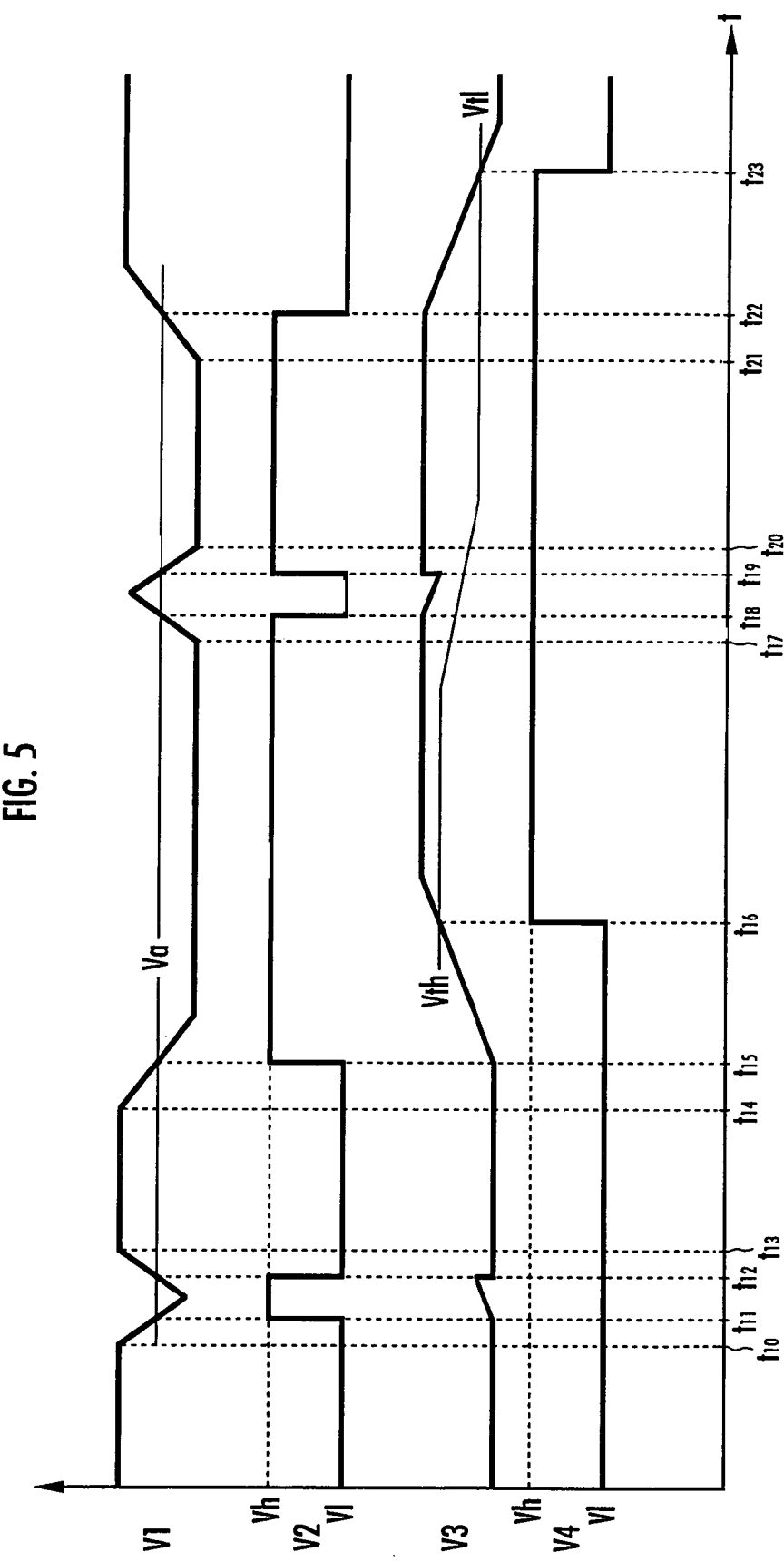
FIG. 5 is a timing chart of a connection detector provided in the charging unit.
Figure 6:
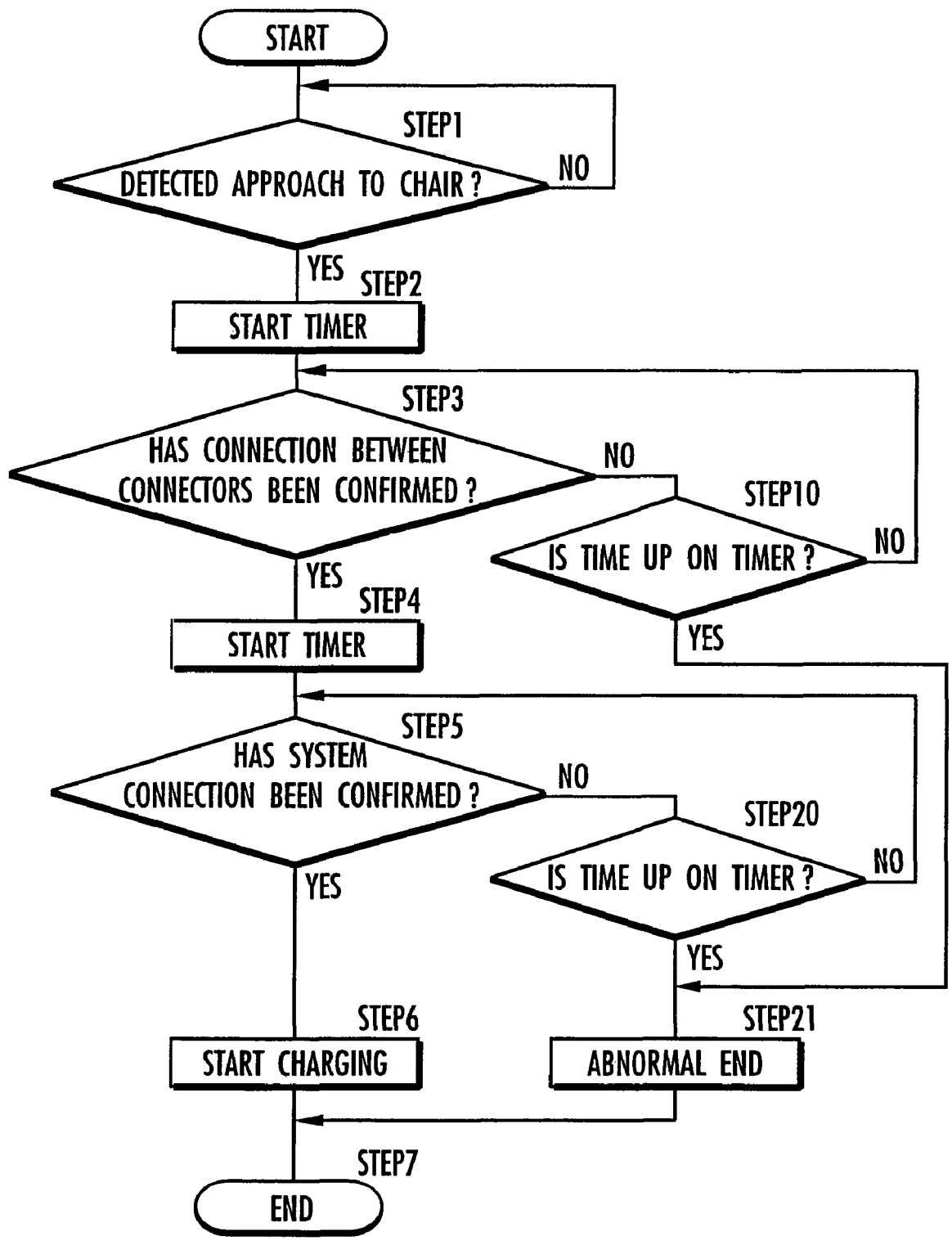
FIG. 6 is a flowchart of the processing for starting charging.
Figure 7:
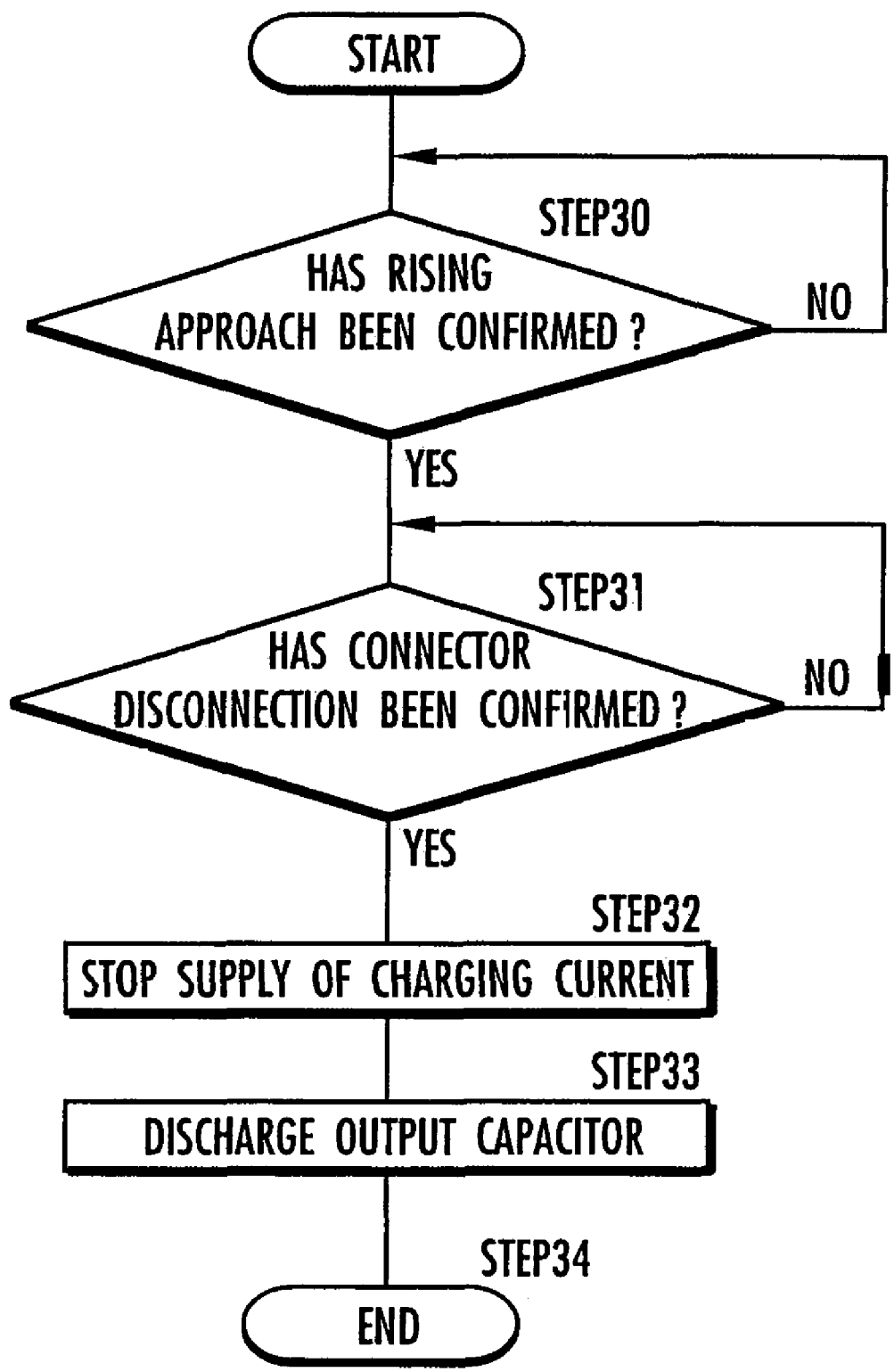
FIG. 7 is a flowchart of the processing for ending the charging.

An embodiment of the present invention will be explained with reference to FIG. 1 through FIG. 7. FIGS. 1A and 1B are explanatory diagrams showing how charging is performed by a charging system of a biped walking robot in accordance with the present invention, FIGS. 2A, 2B and 2C are configuration diagrams showing a power receiving connector provided in the biped walking robot and a power feeding connector provided in a charger, FIGS. 3A, 3B and 3C are configuration diagrams showing a terminal assembly of the power receiving connector provided in the biped walking robot and a terminal assembly of the power feeding connector provided in the charger, FIG. 4 is a circuit configuration diagram of a charging unit provided in the charger, FIG. 5 is a timing chart of a connection detector provided in the charging unit, FIG. 6 is a flowchart of the processing for starting charging, and FIG. 7 is a flowchart of the processing for ending the charging.

Referring to FIG. 1A, the charging system of a biped walking robot is adapted to charge a battery 11 provided in a biped walking robot 10 by a charger 1. The charger 1 is shaped like a chair, and has a seating and retaining unit 2 that holds the thighs and the back of the body of the biped walking robot 10 so as to maintain the biped walking robot 10 at a seated posture when the biped walking robot 2 sits down thereon, as shown in FIG. 1B. The charger 1 includes a power feeding connector 3 that fits to a power receiving connector 12 provided in the biped walking robot 10 and a charging unit 4 that supplies charging current to the biped walking robot 10 through the intermediary of the power feeding connector 3 and the power receiving connector 12.

Thus, charging the battery 11 by holding the biped walking robot 10 at the seated posture obviates the need for continuing power feed to a joint motor between a body 13 and a thigh 14, a joint motor between a thigh 14 and a crus 15, and a joint motor between the crus 15 and a foot 16 in order to maintain the posture. Hence, the battery 11 can be promptly charged while interrupting the power supplied to the above joint motors.

The biped walking robot 10 has a visual sensor (not shown) and recognizes the distance to the position of the charger 1 from imaging data obtained by the visual sensor when charging of the battery 11 has become necessary. Then, the biped walking robot 10 calculates the number of steps required to move to the position of the charger 1, and starts walking toward the charger 1. Thereafter, the biped walking robot 10 stops once immediately before the charger 1 and gives a half turn before it sits onto the seating and retaining unit 2.

Referring now to FIG. 2A, a recession 20 of the power receiving connector 12 provided in the biped walking robot 10 has a tapered configuration 24 whose side surfaces gradually approach to each other as they extends from an opening 21 toward a terminal assembly 23 with a terminal 22 disposed thereon. Shutters 25a and 25b for closing the opening 21 are provided at the front of the opening 21. Meanwhile, the power feeding connector 3 provided in the charger 1 has a terminal 30 which is to be inserted into the terminal 22 of the power receiving connector 12 and which has a projection 31 having its shape matched to the tapered configuration 24 of the recession 20 of the power receiving connector 12.

The shutters 25a and 25b close the opening 21 to block dust when the power receiving connector 12 and the power feeding connector 3 are in a disengaged state, as shown in FIG. 2A. If the power receiving connector 12 comes in contact with the power feeding connector 3 when the biped walking robot 10 sits onto the charger 1, as shown in FIG. 2B, then the shutters 25a and 25b open toward the recession 20 to allow the power feeding connector 3 to be inserted into the recession 20.

Then, as shown in FIG. 2C, the terminal 30 of the power feeding connector 3 is inserted into the terminal 22 of the power receiving connector 12 to complete the engagement between the power feeding connector 3 and the power receiving connector 12. In this case, as the power feeding connector 3 is inserted into the power receiving connector 12, the side surfaces of the projection 31 of the power feeding connector 3 are guided by the tapered configuration 24 of the inner peripheral wall of the recession 20 of the power receiving connector 12, permitting easy positioning of the terminals of the power feeding connector 3 and the power receiving connector 12, respectively.

Referring now to FIG. 3A, the power receiving connector 12 has ten socket-type terminals 22a to 22j, and the power feeding connector 3 has ten pin-type terminals 30a to 30j keyed to the above socket-type terminals 22a to 22j. The charging terminals 30a and 30j of the power feeding connector 3 for supplying charging current are formed to be longer than signal terminals 30b to 30i for transmitting signals. Accordingly, the charging terminals 22a and 22j of the power receiving connector 12 into which the charging terminal 30a and 30j of the power feeding connector 3 are to be inserted are formed deeper than signal terminals 22b to 22i of the power receiving connector 12 into which the signal terminal 30b to the charging terminal 30i of the power feeding connector 3 are to be inserted.

Therefore, when fitting the power receiving connector 12 to the power feeding connector 3, the charging terminals 30a and 30j at both ends of the power feeding connector 3 are first inserted into the charging terminals 22a and 22j, respectively, at both ends of the power receiving connector 12, as shown in FIG. 3B, thus bringing them into conduction. After that, as shown in FIG. 3C, the signal terminals 30b to 30i, which are shorter (the insertion lengths being smaller than those of the charging terminals 30a and 30j) than the charging terminal 30a and 30j of the power feeding connector 3, are inserted into the signal terminals 22b to 22i of the power receiving connector 12 so as to be brought into conduction.

Conversely, when the power receiving connector 12 is disengaged from the power feeding connector 3, the signal terminals 30b to 30i of the power feeding connector 3, which are short, are first disconnected from the signal terminals 22b to 22i, respectively, of the power receiving connector 12. Thereafter, the charging terminals 30a and 30j of the power feeding connector 3, which are long, are disconnected from the charging terminals 22a and 22j, respectively, of the power receiving connector 12.

The charging terminals 30a and 30j of the power feeding connector 3 correspond to first charging terminals in the present invention, while the charging terminals 22a and 22j of the power receiving connector 12 correspond to second charging terminals in the present invention.

Referring now to FIG. 4, the charging unit 4 provided in the charger 1 is equipped with a connection detector 50 for detecting whether the power feeding connector 3 and the power receiving connector 12 are in the connected state, and a charging current generator 60 for generating charging current for the biped walking robot 10.

The connection detector 50 includes a comparator 51 that compares a voltage V1 of the signal terminal 30b of the power feeding connector 3 relative to GND with a threshold voltage Va, a delay circuit 52 for delaying a change in an output voltage V2 of the comparator 51, a Schmitt trigger circuit 53 for shaping an output voltage V3 of the delay circuit 52, and a CPU 54 that receives an output voltage V4 of the Schmitt trigger circuit 53 to determine whether the power feeding connector 3 and the power receiving connector 12 are in the connected state.

The comparator 51 outputs a high-level voltage Vh if the input voltage V1 supplied to a negative input terminal is not more than an input voltage Va supplied to a positive input terminal, and outputs a low-level voltage Vl if the input voltage V1 supplied to the negative input terminal is higher than the input voltage Va supplied to the positive input terminal. In the Schmitt trigger circuit 53, when an input voltage increases, if the input voltage V3 reaches a threshold value Vth or more in the rising direction, then the output voltage V4 switches from V1 to Vh. Similarly, when the input voltage V3 drops, if the input voltage V3 drops down to a threshold value Vt1 or less in the dropping direction, then the output voltage V4 switches from Vh to V1.

The charging current generator 60 includes a transformer circuit 61 that steps down AC power supplied through the intermediary of a plug 70, a rectifier circuit 62 that performs full-wave rectification of an AC voltage output from the transformer circuit 61, a DC/DC converter 63 that transforms a DC voltage output from the rectifier circuit 62, a capacitor 64 connected across output terminals of the DC/DC converter 63, and a discharger circuit 65 for discharging charges from the capacitor 64. The current output from the DC/DC converter 63 and the discharging operation of the discharger circuit 65 are controlled by control signals issued from the CPU 54.

Referring to FIG. 4, a signal terminal 30b pulled up to Vcc by a resistor 55 is connected to the negative input terminal of the comparator 51, while a signal terminal 30c adjacent to the signal terminal 30b is in conduction to a GND level. A threshold voltage Va applied to the positive input terminal of the comparator 51 is set in the vicinity of a level midway between the GND level and the Vcc level. The signal terminals 30b and 30c of the power feeding connector 3 correspond to first detecting terminals in the present invention, and the signal terminals 22b and 22c of the power receiving connector 12 correspond to second detecting terminals in the present invention.

In the power receiving connector 12, the signal terminal 22b to be connected to the signal terminal 30b of the power feeding connector 3 and the signal terminal 22c to be connected to the signal terminal 30c of the power feeding connector 3 are short-circuited through a conductor 80. Thus, when the power feeding connector 3 and the power receiving connector 12 are in a disengaged state, a voltage V1 applied to the positive input terminal of the comparator 51 is Vcc (>Va), and an output voltage V2 of the comparator 51 is V1, which indicates a low level. Conversely, when the power feeding connector 3 and the power receiving connector 12 are in the connected state, V1 is GND (<Va), so that the output voltage V2 of the comparator 51 is Vh, which indicates a high level.

This arrangement enables the CPU 54, which monitors an output voltage V4 of the Schmitt trigger circuit 53, to detect that the power feeding connector 3 and the power receiving connector 12 are in the disconnected state if V4 is Vh, and that the power feeding connector 3 and the power receiving connector 12 are in the connected state if V4 is V1.

FIG. 5 is a timing chart showing the transition of voltages V1 to V4 in the connection detector 50, the axis of ordinates indicating voltage and the axis of abscissas indicating time. The timing chart in FIG. 5 indicates that the power feeding connector 3 is connected to the power receiving connector 12 at $t_{14}$ and the power feeding connector 3 is disconnected from the power receiving connector 12 at $t_{21}$.

From $t_{14}$ at which the power feeding connector 3 is connected to the power receiving connector 12, the input voltage V1 applied to the negative input terminal of the comparator 51 gradually drops, and the output voltage V2 of the comparator 51 switches from V1 to Vh at $t_{15}$, at which V1 reaches the threshold value Va or less. At $t_{16}$, following a time lag imparted by the operation of the delay circuit 52, the output voltage V3 of the delay circuit 52 exceeds the threshold value Vh in the voltage increasing direction in the Schmitt trigger circuit 53, causing the output voltage V4 of the Schmitt trigger circuit 53 to switch from V1 to Vh.

Further, from $t_{21}$, at which the power feeding connector 3 is detached from the power receiving connector 12, the voltage V1 at the negative input terminal of the comparator 51 gradually increases. At $t_{22}$, V1 reaches a level higher than the threshold value Va, causing the output voltage V2 of the comparator 51 to switch from Vh to V1. Further, at $t_{23}$, following a time lag imparted by the operation of the delay circuit 52, the output voltage V3 of the delay circuit 52 drops below the threshold value Vt1 in the voltage dropping direction in the Schmitt trigger circuit 53, causing the output voltage V4 of the Schmitt trigger circuit 53 to switch from Vh to V1.

During the period from too to $t_{13}$, a noise is superposed on the input voltage V1 applied to the negative input terminal of the comparator 51, causing the output voltage V2 of the comparator 51 to be Vh during the period from $t_{11}$ to $t_{12}$. However, the operation of the delay circuit 52 restrains the output voltage V3 of the delay circuit 52 from exceeding the threshold value Vth in the voltage rising direction of the Schmitt trigger circuit 53. Hence, the output voltage V4 of the Schmitt trigger circuit 53 is maintained at V1.

Further, during the period from $t_{17}$ to $t_{20}$, a noise is superposed on the input voltage V1 applied to the negative input terminal of the comparator 51, causing the output voltage V2 of the comparator 51 to be V1 during the period from $t_{18}$ to $t_{19}$. However, the operation of the delay circuit 52 restrains the output voltage V3 of the delay circuit 52 from dropping to the threshold value Vt1 or less in the voltage dropping direction of the Schmitt trigger circuit 53. Hence, the output voltage V4 of the Schmitt trigger circuit 53 is maintained at Vh.

Thus, providing the delay circuit 52 and the Schmitt trigger circuit 53 makes it possible to restrain the output voltage V4 of the Schmitt trigger circuit 53, which is supplied to the CPU 54, from switching when a noise is superposed on the input voltage V1 applied to the negative input terminal of the comparator 51. With this arrangement, it is possible to prevent a detection error in which the power feeding connector 3 and the power receiving connector 12 are erroneously detected to be in the disconnected state, whereas they are actually in the connected state, or conversely, the power feeding connector 3 and the power receiving connector 12 are erroneously detected to be in the connected state whereas they are actually in the disconnected state.

Referring now to the flowchart shown in FIG. 6, the procedure of executing the processing for starting to charge the biped walking robot 10 by the CPU 54 provided in the connection detector 50 will be explained. The configuration for controlling the output of charging current supplied to the biped walking robot 10 by the CPU 54 corresponds to a charging controller in the present invention.

When the CPU 54 detects, in STEP1 of FIG. 6, that the biped walking robot 10 has started to approach the charger 1 to sit thereon, the CPU 54 proceeds to STEP2 wherein it starts a timer. The start of the approach by the biped walking robot 10 to the charger 1 to sit thereon is detected by, for example, a visual sensor (not shown) provided in the charger 1 that detects the approach of the biped walking robot 10 or by the charger 1 receiving a charging approach start signal wirelessly transmitted from the biped walking robot 10.

Then, the CPU 54 executes a loop comprised of the subsequent STEP3 and STEP10, and waits in STEP3 until the output voltage V4 of the Schmitt trigger circuit 53 switches from V1 to Vh, which indicates that the power feeding connector 3 and the power receiving connector 12 are connected, while checking whether time is up on the timer in STEP10.

If it is detected that the power feeding connector 3 and the power receiving connector 12 are in the connected state, the CPU 54 proceeds to STEP4 wherein it restarts the timer. Meanwhile, if time is up in STEP10, then it is determined that a failure of connection between the power feeding connector 3 and the power receiving connector 12 has occurred, so that the CPU 54 proceeds to STEP21 wherein the CPU 54 executes the processing for an abnormal end to give a notice by sounding a buzzer (not shown), then proceeds to STEP7. In this case, the charging of the biped walking robot is not executed.

The CPU 54 executes a loop composed of the subsequent STEP5 and STEP20 to wait in STEP5 until communication through the intermediary of the power feeding connector 3 and the power receiving connector 12 is enabled and system connection is detected, while checking whether the time is up on the timer in STEP20. When the system connection between the biped walking robot 10 and the charger 1 is detected, the CPU 54 proceeds to STEP6 wherein the CPU 54 sets the DC/DC converter 63 to a current output state so as to start supply of charging current to the biped walking robot 10 through the intermediary of the power feeding connector 3 and the power receiving connector 12.

Meanwhile, if it is determined that time is up on the timer in STEP20, then the CPU 54 proceeds to STEP21 to carry out the processing for abnormal end, and then proceeds to STEP7. In this case, the processing for charging the biped walking robot 10 is not carried out. Thus, the connection between the power feeding connector 3 and the power receiving connector 12 is confirmed in STEP3 and the system connection between the charger 1 and the biped walking robot 10 is confirmed in STEP5 before beginning the supply of charging current. This makes it possible to restrain a failure caused by poor connection between the power feeding connector 3 and the power receiving connector 12 or an error of communication between the charger 1 and the biped walking robot 10, which leads to prevention of the battery 11 from being properly charged.

Referring now to the flowchart shown in FIG. 7, the procedure for carrying out the processing of ending the charging of the biped walking robot 10 by the CPU 54 will be explained. The CPU 54 proceeds to STEP31 when it receives a signal indicating the start of the execution of standing approach from the biped walking robot 10 in STEP30.

Then, the CPU 54 waits until the output voltage V4 of the Schmitt trigger circuit 53 (refer to FIG. 4) switches from Vh to V1. As shown in FIG. 3B, at the point when the signal terminal 30b is detached from the signal terminal 22b and the signal terminal 30c is detached from the signal terminal 22c, the charging terminals 30a and 30j of the power feeding connector 3 are still in conduction with the charging terminals 22a and 22j, respectively, of the power receiving connector 12.

Therefore, when the disconnection between the power feeding connector 3 and the power receiving connector 12 has been confirmed in STEP31, the CPU 54 proceeds to STEP32 to stop the supply of charging current by the DC/DC converter 63 and discharges the charges of the capacitor 64 by the discharger circuit 65 in STEP33. With this arrangement, the charges of the capacitor 64 can be reduced before the charging terminals 30a and 30j of the power feeding connector 3 are completely detached from the charging terminals 22a and 22j of the power receiving connector 12, thus making it possible to restrain the occurrence of spark discharge when the charging terminals 30a and 30j of the power feeding connector 3 are detached from the charging terminals 22a and 22j of the power receiving connector 12.

The speed of discharging by the discharger circuit 65 is preferably set such that all charges of the capacitor 64 are discharged before the charging terminals 30a and 30j of the power feeding connector 3 are completely detached from the charging terminals 22a and 22j of the power receiving connector 12.

As shown in FIG. 3A to 3C, according to the present embodiment, the charging terminals 30a and 30j of the power feeding connector 3 are formed to be longer than the signal terminals 30b to 30i, and the charging terminals 22a and 22j of the power receiving connector 12 are formed to be deeper than the signal terminals 22b to 22i to match the charging terminals 30a and 30j. The advantages of the present invention, however, can be obtained by an alternative configuration provided with a device for detecting that a power feeding connector and a power receiving connector are in a connected state.

In this case, a certain time lag takes place from the moment the shift of the power feeding connector and the power receiving connector from the connected state to the disconnected state is detected to the moment the output of the DC/DC converter is stopped. It is necessary, therefore, to provide a mechanism for securing time that overcomes the aforesaid time lag until the charging terminals are detached after the signal terminals are detached.

In the present embodiment, the shutters 25a and 25b that cover the opening of the power receiving connector 3 are provided, as shown in FIGS. 2A to 2C. The advantages of the present invention, however, can be obtained even if the shutters 25a and 25b are not provided.

In the present embodiment, as shown in FIG. 4, the discharger circuit 65 is provided to discharge the charges of the capacitor 64 when disconnecting the power feeding connector 3 and the power receiving connector 12. This processing, however, is not essential to obtain the advantages of the present invention.

What is claimed is:

1. A charging system of a biped walking robot for charging a battery provided in the biped walking robot, comprising:

a seating and retaining means on which the biped walking robot can sit and which retains the biped walking robot at a seated posture, wherein thighs and a back of a body of the biped walking robot are held at predetermined positions of the seating and retaining means;

a power feeding connector to be connected to a power receiving connector provided in the biped walking robot in a state that the biped walking robot is maintained at the seated posture by the seating and retaining means, the power feeding connector having a first charging terminal and a first detecting connector;

connection detecting means for detecting whether the power receiving connector and the power feeding connector are in a connected state;

a charging power source for supplying charging current to the battery;

communication means for communicating with the biped walking robot; and a charging control means for charging the battery by supplying charging current to the battery from the charging power source through the power feeding connector and the power receiving connector in response to a signal from the biped walking robot via the communication means notifying the start of seating approach to the seating and retaining means, wherein a timer is started based on the notifying the start of seating approach and then the connection detecting means detects that the power receiving connector and the power feeding connector are in the connected state, wherein in the course of transition of the power feeding connector and the power receiving connector from a disconnected state to a connected state, the first charging terminal and a second charging terminal of the power receiving connector are brought into a conduction state from a detached state, and then the first detecting terminal and a second detecting terminal of the power receiving connector are brought into a conduction state from a detached state, the connection detecting means detects that the power feeding connector and the power receiving connector are in the connected state when the first detecting terminal and the second detecting terminal are brought into conduction, and when the state detected by the connection detecting means is switched from a state wherein the power feeding connector and the power receiving connector are not in connection to a state wherein the power feeding connector and the power receiving connector are in connection and the timer has not expired, the charging control means starts supply of charging current from the charging power source to the battery, wherein, in the course of transition of the power feeding connector and the power receiving connector from the connected state to the disconnected state, the first detecting terminal and the second detecting terminal are brought into the detached state from the conduction state, and then the first charging terminal and the second charging terminal are brought into the detached state from the conduction state, further comprising:

a capacitor connected across output terminals of the charging power source; and discharging means for discharging charges from the capacitor, and wherein, after receiving a signal from the biped walking robot via the communication means notifying the start of the execution of standing approach, and then the state detected by the connection detecting means is switched from a state wherein the power feeding connector and the power receiving connector are in connection to a state wherein the power feeding connector and the power receiving connector are not in connection, the charging control means stops supply of charging current by the charging power source and discharges the charges from the capacitor by the discharging means.

2. The charging system of a biped walking robot according to claim 1, wherein the power receiving connector has a tapered recession whose inclined surfaces gradually approach each other toward a terminal from the opening, and the power feeding connector has a projection shaped to match the tapered shape of the power receiving connector.

3. The charging system of a biped walking robot according to claim 1, further comprising a shutter provided at the front of the power receiving connector, wherein the shutter covers an opening of the power receiving connector in a state wherein the power receiving connector has been disconnected from the power feeding connector, whereas the shutter is released to expose the opening as the power feeding connector comes in contact with the power receiving connector when the power receiving connector is fitted to the power feeding connector.

4. The charging system of a biped walking robot according to claim 3, wherein the power receiving connector has a tapered recession whose inclined surfaces gradually approach each other toward a terminal from the opening, and the power feeding connector has a projection shaped to match the tapered shape of the power receiving connector.

5. The charging system of a biped walking robot according to claim 1, wherein the first charging terminal and the first detecting terminal are pin-type terminals provided in parallel to each other, the second charging terminal is a socket-type terminal into which the first charging terminal is inserted when the power receiving connector and the power feeding connector are connected, the second detecting terminal is a socket-type terminal into which the first detecting terminal is inserted when the power receiving connector and the power feeding connector are connected, and the length of insertion of the first charging terminal into the second charging terminal is set to be greater than the length of insertion of the first detecting terminal into the second detecting terminal when the power receiving connector and the power feeding connector are connected.

6. The charging system of a biped walking robot according to claim 1, wherein the biped walking robot comprises a joint motor in associated leg portions to which power is supplied to enable the biped walking robot to walk.

7. A charging system of a biped walking robot for charging a battery provided in the biped walking robot, comprising:

a seating and retaining unit on which the biped walking robot can sit and configured to retain the biped walking robot at a seated posture, wherein thighs and a back of a body of the biped walking robot are held at predetermined positions of the seating and retaining unit;

a power feeding connector configured to be connected to a power receiving connector provided in the biped walking robot in a state that the biped walking robot is maintained at the seated posture by the seating and retaining unit, the power feeding connector having a first charging terminal and a first detecting connector;

a connection detector configured to detect whether the power receiving connector and the power feeding connector are in a connected state;

a charging power source configured to supply charging current to the battery;

a communication unit configured to communicate with the biped walking robot; and a charging control unit configured to charge the battery by supplying charging current to the battery from the charging power source through the power feeding connector and the power receiving connector in response to a signal from the biped walking robot via the communication unit notifying the start of seating approach to the seating and retaining unit, wherein a timer is started based on the notifying the start of seating approach and then the connection detector detects that the power receiving connector and the power feeding connector are in the connected state, wherein in the course of transition of the power feeding connector and the power receiving connector from a disconnected state to a connected state, the first charging terminal and a second charging terminal of the power receiving connector are brought into a conduction state from a detached state, and then the first detecting terminal and a second detecting terminal of the power receiving connector are brought into a conduction state from a detached state, the connection detector detects that the power feeding connector and the power receiving connector are in the connected state when the first detecting terminal and the second detecting terminal are brought into conduction, and when the state detected by the connection detector is switched from a state wherein the power feeding connector and the power receiving connector are not in connection to a state wherein the power feeding connector and the power receiving connector are in connection and the timer has not expired, the charging control means starts supply of charging current from the charging power source to the battery, wherein, in the course of transition of the power feeding connector and the power receiving connector from the connected state to the disconnected state, the first detecting terminal and the second detecting terminal are brought into the detached state from the conduction state, and then the first charging terminal and the second charging terminal are brought into the detached state from the conduction state, further comprising a capacitor connected across output terminals of the charging power source; and a discharger configured to discharge charges from the capacitor, and wherein after receiving a signal from the biped walking robot via the communication unit notifying the start of the execution of standing approach, and then the state detected by the connection detector is switched from a state wherein the power feeding connector and the power receiving connector are in connection to a state wherein the power feeding connector and the power receiving connector are not in connection, the charging control unit stops supply of charging current by the charging power source and discharges the charges from the capacitor by the discharger.

* * * * *